(12) United States Patent  (10) Patent No.: US 8,487,978 B2
Huang  (45) Date of Patent: Jul. 16, 2013

(54) REMOTE CONFERENCE MANAGEMENT SYSTEM AND METHOD EMPLOYING THE SAME

(75) Inventor: Liang-Yi Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 237 days.

(21) Appl. No.: 13/074,111

(22) Filed: Mar. 29, 2011

(65) Prior Publication Data

US 2012/0206561 A1   Aug. 16, 2012

(30) Foreign Application Priority Data

Feb. 16, 2011   (CN) .......................... 2011 1 0038879

(51) Int. Cl.
*H04N 7/15*   (2006.01)
(52) U.S. Cl.
USPC .................. 348/14.09; 348/14.08; 348/14.12
(58) Field of Classification Search
USPC ......................... 348/14.01–14.16; 379/202.01
See application file for complete search history.

(56) References Cited

U.S. PATENT DOCUMENTS

| | | | |
|---|---|---|---|
| 2006/0057550 A1* | 3/2006 | Sahashi | 434/350 |
| 2007/0188598 A1* | 8/2007 | Kenoyer | 348/14.08 |
| 2009/0323916 A1* | 12/2009 | O'Sullivan et al. | 379/202.01 |

* cited by examiner

*Primary Examiner* — Melur Ramakrishnaiah
(74) *Attorney, Agent, or Firm* — Altis Law Group, Inc.

(57) ABSTRACT

A remote conference management system includes a conferencing control terminal and a conferencing terminal in electronic communication with the conferencing control terminal. The conferencing control terminal includes a multipoint control unit that stores a plurality of predetermined face images of anticipated meeting participants. The conferencing terminal includes an image recording unit and a signal control unit. The image recording unit records face images of current participants. The signal control unit receives the face images from the image recording unit and transmits the face image to the MCU. The MCU compares the received face images with the prestored face images, and creates and communicates attendance information of the current participants according to the comparison.

20 Claims, 3 Drawing Sheets

REMOTE CONFERENCE MANAGEMENT SYSTEM AND METHOD EMPLOYING THE SAME

BACKGROUND

1. Technical Field

The disclosure generally relates to video conferencing, and more particularly to a remote conference management system and a management method based on facial detection and recognition technology.

2. Description of the Related Art

Remote video conferencing technology is widely used. It is common in video conferences that many people are anticipated to participate. However, seldom do all participants join the conference at the same time. So those first in attendance must either wait for the latecomers or interrupt the meeting at the arrival of each latecomer to make introductions, which is inconvenient, time consuming, and annoying.

Therefore, there is room for improvement within the art.

BRIEF DESCRIPTION OF THE DRAWINGS

Many aspects of an exemplary remote conference management system and method employing the same can be better understood with reference to the following drawings. The components in the drawings are not necessarily drawn to scale, the emphasis instead being placed upon clearly illustrating the principles of the exemplary remote conference management system and method employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
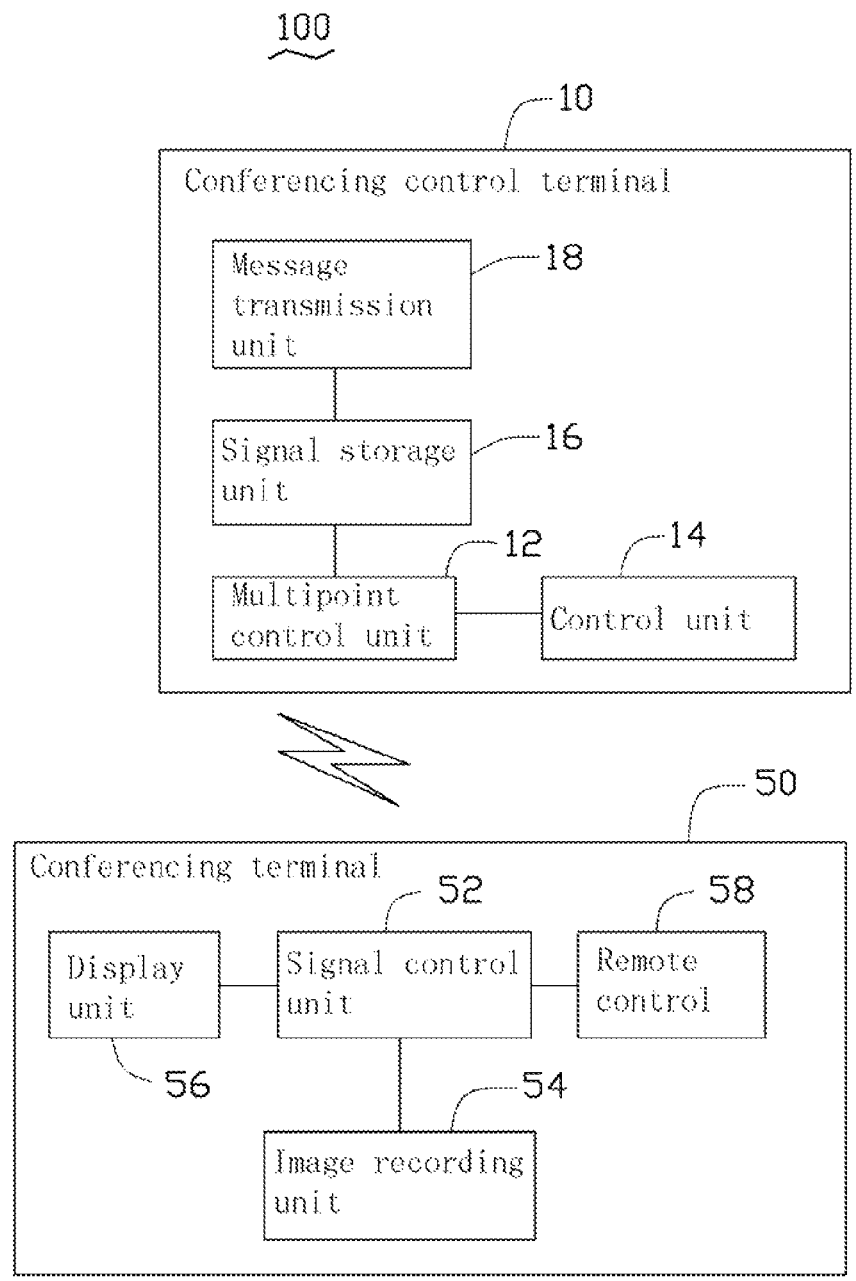
FIG. 1 is a block view of a remote conference management system, according to an exemplary embodiment of the disclosure.

FIG. 1 shows a block view of a remote conference management system 100, according to an exemplary embodiment, which includes the use of facial detection and recognition technologies. The remote conference management system 100 includes a conferencing control terminal 10 and at least one conferencing terminal 50. In this exemplary embodiment, the conferencing control terminal 10 is in electronic communication with the conferencing terminals 50 through a wireless connection or a cable connection, using a network such as the Internet, an intranet, or a local area network (LAN).

The conferencing control terminal 10 includes a multipoint control unit (MCU) 12, a control unit 14, a signal storage unit 16, and a message transmission unit 18. Each conferencing terminal 50 includes a signal control unit 52, an image recording unit 54, a display unit 56, and a remote control 58.

In this exemplary embodiment, the MCU 12 is an endpoint of a LAN that enables the conferencing terminals 50 to participate in a multipoint conference. The MCU 12 includes a face image database containing a plurality of face images and other information of anticipated meeting participants such as employees or customers. The MCU 12 is for communicating with the signal control unit 52 of the conferencing terminal 50 through wireless or cable connections, to transmit and receive live audio and/or video signals.

The control unit 14 is in electronic communication with the MCU 12 and is for controlling the MCU 12 to implement different operations. The signal storage unit 16 is electrically connected to the MCU 12 and is for storing face images and information regarding current meeting participants. In this exemplary embodiment, the signal storage unit 16 can be an office server. The message transmission unit 18 is electrically connected to the signal storage unit 16, and is for transmitting short messages and/or e-mails to the anticipated meeting participants to remind them to attend the conference timely or to alert them when the meeting has started if they have not yet started participation.

The signal control unit 52 can be a high definition video conference (HDVD) box, and is electrically connected to the image recording unit 54 through a universal serial bus (USB). The signal control unit 52 is for controlling the image recording unit 54 to capture face images of current participants in the meeting and transmitting the face images to the conferencing control terminal 10. In this exemplary embodiment, the image recording unit 54 can be a digital camera, which can capture video and/or still face images, and the signal control unit 52 can adjust the lens (not shown) of the image recording unit 54 to capture face images.

The display unit 56 can be a high definition (HD) device or HD television capable of receiving a high definition video feed and is electrically connected to the signal control unit 52 through a high definition multimedia interface (HDMI). For example, the display unit 56 receives the video and/or face images of the current meeting participants from the conferencing control terminal 10, and displays the video and/or face images. The remote control 58 is in electronic communication with the signal control unit 52 and is for controlling the signal control unit 52 to implement different operations and further controlling the image recording unit 54 to capture face images of the current meeting participants.

Figure 2:
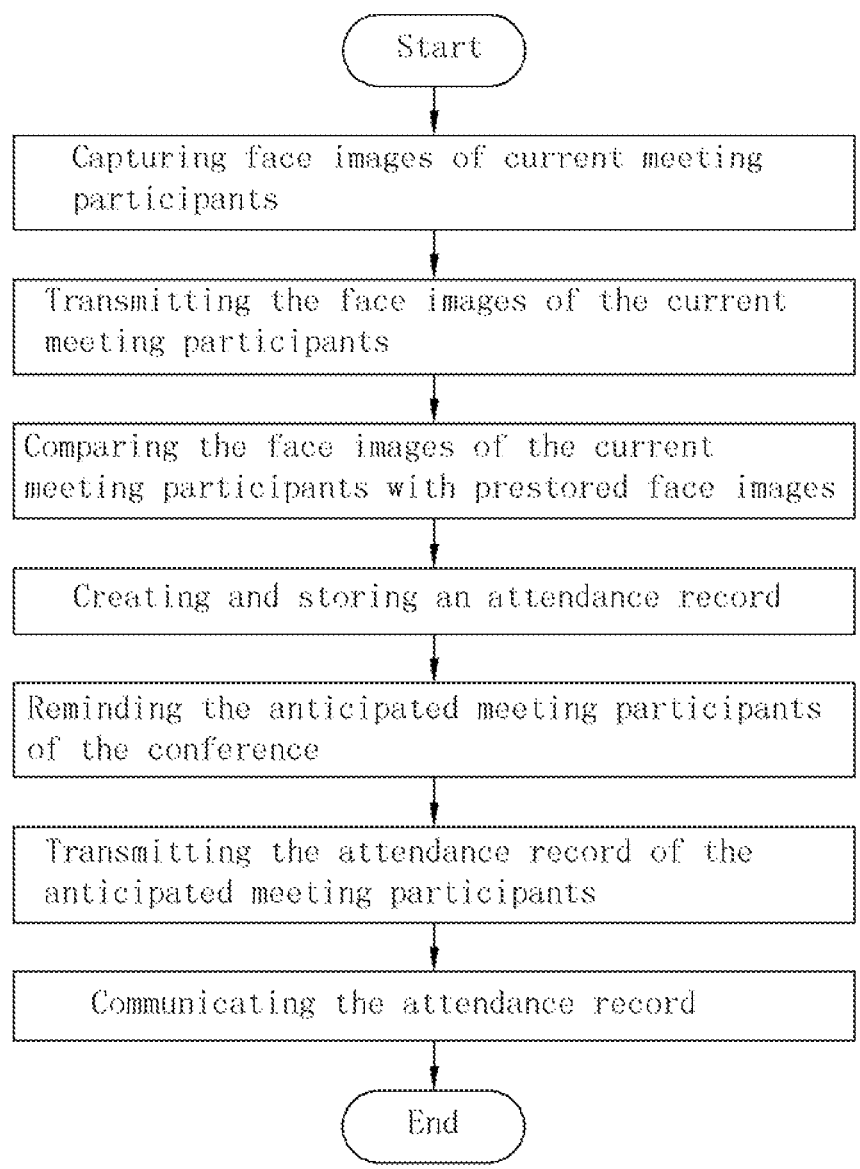
FIG. 2 is a flowchart of a method of pre-conference preparation, according to an exemplary embodiment of the disclosure.

Referring to FIG. 2, pre-conference preparation, a face image database including face images and information regarding anticipated meeting participants is created in the MCU 12. The image recording unit 54 captures face images of current meeting participants, and transmits the face images to the signal control unit 52. The signal control unit 52 transmits the face images of the current meeting participants to the MCU 12 through wireless or cable connections. The MCU 12 compares the face images of the current meeting participants with the prestored face images in the face image database and creates an attendance record which includes names of current meeting participants, time of the current participants joined the meeting, and names of anticipated participants who have not yet joined the meeting. The signal storage unit 16 stores the attendance record, and controls the message transmission unit 18 to send a short message and/or email to the anticipated meeting participants who have not yet joined the meeting to join the meeting. If the message transmission unit 18 receives a reply from any of the absent participants, the reply is stored in the signal storage unit 16. The attendance record is transmitted to the signal control unit 52, and communicated either by display by the display unit 56, printing on a printer (not shown), or any other method.

Figure 3:
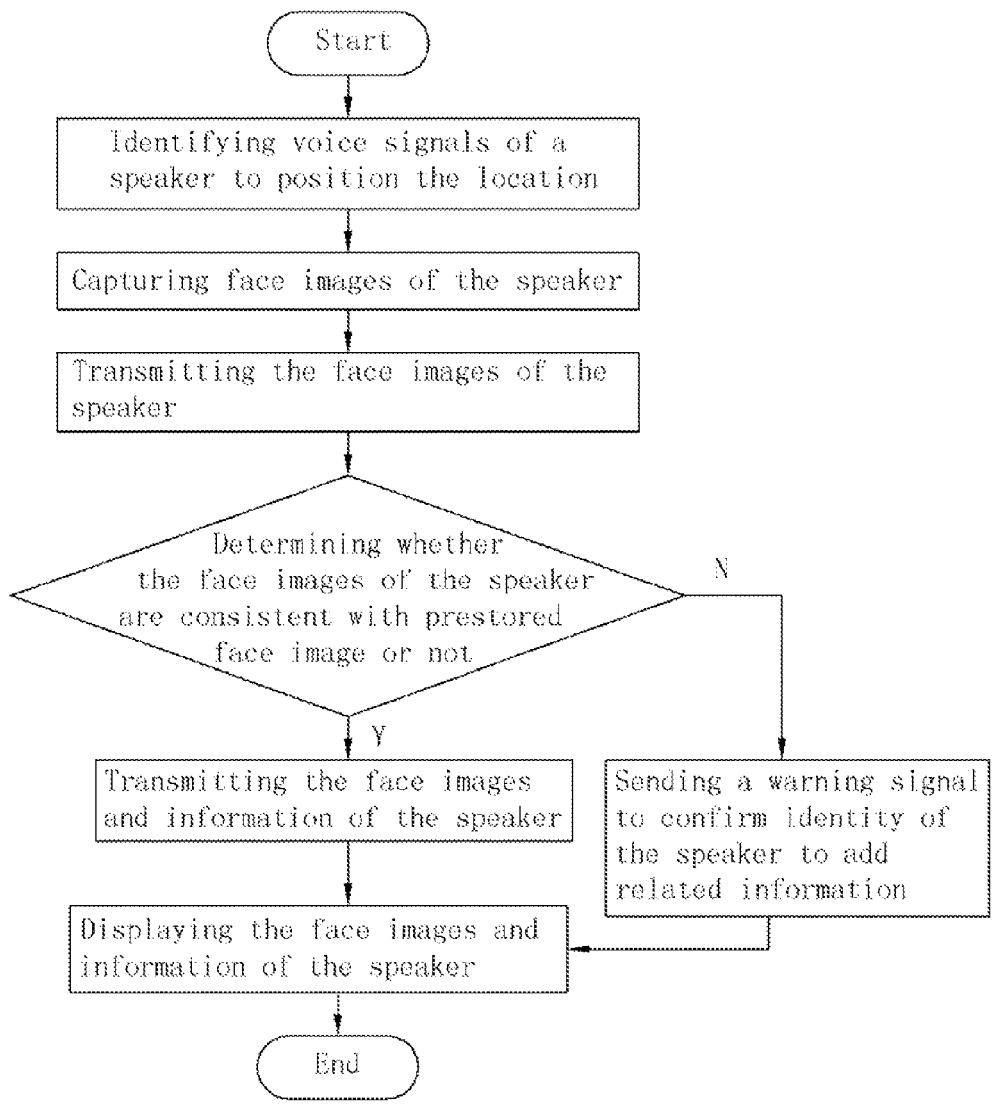
FIG. 3 is a flowchart of the method for conducting a remote conference, according to the exemplary embodiment of the disclosure.

Referring to FIG. 3, during the conference, to automatically show the face image and information of the speaker, the signal control unit 52 identifies the voice of the speaker using voice recognition technology to determine identity of the speaker, the signal control unit 52 then controls and adjusts the image recording unit 54 to capture and record face images of the speaker, and transmits the face images to the MCU 12 through the signal control unit 52. The MCU 12 accesses the signal storage unit 16 and determines whether the face image is consistent with the previously stored face image. If the MCU 12 identifies the face image of the speaker, the face images and related information is transmitted to the signal control unit 52, and is displayed on the display unit 56. If the MCU 12 determines the face image of the speaker is inconsistent with the prestored face images, the MCU 12 sends a warning signal to remind the conferencing control terminal 10 to confirm identity of the speaker and add related information. Thus, the meeting attendees can directly share the information of the speaker on the display unit 56, avoiding self-introduction and saving time.

After the conference, the image recording unit 54 transmits the captured face images of the participants to the MCU 12 through the signal control unit 52. The MCU 12 records the name and the log-out time of the participants, then stores that record in the signal storage unit 16. Thus, the conferencing control terminal 10 can conveniently manage attendance and conference according to the attendance record of the anticipated meeting participants.

Additionally, the control unit 14 and the remote control 58 can send a command signal to the signal control unit 52 to aim and focus the image recording unit 54 on the speaker to capture the face images, and the face images are transmitted to the MCU 12. Moreover, information about the anticipated meeting participants can also be arranged according to a predetermined order, corresponding to a number on the control unit 14 and the remote control 58, therefore, the face image and related information can also be shared and displayed on the display unit 56 by selecting the corresponding number on the control unit 14 or the remote control 58.

In summary, in the remote conference management system 100 of this exemplary embodiment, the conferencing terminals 50 capture and record face images of the current meeting participants, the conferencing control terminal 10 compares the received face images with prestored face images, and makes a list of the current meeting participants and the anticipated meeting participants. Additionally, the management system 100 can display and share the information during the conference through a live video and/or audio feed, resulting in avoiding self-introductions and shortening the meeting time.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A remote conference management system, comprising:
    a conferencing control terminal comprising:
        a multipoint control unit (MCU) storing a plurality of predetermined face images of anticipated meeting participants; and
        a conferencing terminal in electronic communication with the conferencing control terminal, the conferencing terminal comprising:
            an image recording unit that captures and records face images of current meeting participants; and
            a signal control unit that electrically connects with the image recording unit, wherein the signal control unit receives the face images of the current meeting participants from the image recording unit and transmits the face images to the MCU, the MCU compares the received face images with the prestored face images and creates an attendance record according to the comparison.

2. The remote conference management system as claimed in claim 1, wherein the remote conference management system uses facial detection and recognition technologies to manage remote conferences.

3. The remote conference management system as claimed in claim 1, wherein the attendance record comprises names of current meeting participants, time of the current participants joined the meeting, and names of anticipated participants who have not yet joined the meeting.

4. The remote conference management system as claimed in claim 1, wherein the conferencing control terminal further comprises a control unit electrically communicated with the MCU, and the control unit is for controlling the MCU to implement different operations.

5. The remote conference management system as claimed in claim 4, wherein the conferencing control terminal further comprises a signal storage unit, the signal storage unit is electrically connected to the MCU and is for storing face images and information regarding current meeting participants from the conferencing terminal.

6. The remote conference management system as claimed in claim 5, wherein the conferencing control terminal further comprises a message transmission unit electrically connected to the signal storage unit, the message transmission unit is for sending reminder messages to the anticipated meeting participants to remind them to attend the conference or to alert them when the meeting has started if they have not yet started participation.

7. The remote conference management system as claimed in claim 1, wherein the signal control unit is electrically connected to the image recording unit through a universal serial bus, and is for controlling the image recording unit to capture and record the face images and transmitting the face images of the current participants in the meeting to the MCU of the conferencing control terminal.

8. The remote conference management system as claimed in claim 1, wherein the conferencing terminal further comprises a display unit, the display unit is electrically connected to the signal control unit through a high definition multimedia interface, the display unit receives video and/or face images of the current meeting participants from the MCU of the conferencing control terminal and displays the video and/or the face images.

9. The remote conference management system as claimed in claim 8, wherein the conferencing terminal further comprises a remote control in electronic communication with the signal control unit, the remote control is for controlling the signal control unit to implement different operation and further controlling the image recording unit to capture and record face images of the current meeting participants.

10. The remote conference management system as claimed in claim 1, wherein the signal control unit identifies the voice of a speaker using voice recognition technology to determine identity of the speaker, the signal control unit controls and adjusts the image recording unit to capture and record the face images of the speaker and transmits the face images to MCU, and the MCU compares the face images with the prestored face images.

11. The remote conference management system as claimed in claim 10, wherein if the MCU identifies the face image of the speaker, the face images and related information of the speaker is transmitted to the signal control unit, and is displayed on the display unit; if the MCU fails to identify and find the face image of speaker, the MCU sends a warning signal to remind the conferencing control terminal to confirm identity of the speaker and add information.

12. The remote conference management system as claimed in claim 3, wherein the control unit sends a command signal to the signal control unit to aim and focus the image recording unit on the speaker to capture the face images, and the face images are transmitted to the MCU.

13. The remote conference management system as claimed in claim 8, wherein the remote control sends a command signal to the signal control unit to aim and focus the image recording unit on the speaker to capture the face images, and the face images are transmitted to the MCU.

14. The remote conference management system as claimed in claim 8, wherein information about the anticipated meeting participants are arranged and numbered according to a predetermined order corresponding to a number on the remote control, the remote control selects the corresponding number to display and share face image and information on the display unit.

15. A management method for controlling a remote conference, comprising steps of:
    capturing face images of current meeting participants of the remote conference;
    comparing the face images of the current meeting participants with prestored face images;
    creating and storing an attendance record;
    communicating the attendance record;
    arranging and numbering a predetermined order corresponding to a number for each of the current meeting participants; and
    selecting the corresponding number to display the face images of a speaker of the current meeting participants.

16. The management method as claimed in claim 15, further comprising electronically reminding the anticipated meeting participants of the conference.

17. The management method as claimed in claim 15, further comprising capturing and transmitting the face images of the speaker.

18. The management method as claimed in claim 17, further comprising determining whether the face images of the speaker are consistent with prestored images or not.

19. The management method as claimed in claim 18, further comprising displaying the face images and information of the speaker when the face images are consistent with the prestored face images.

20. The management method as claimed in claim 17, further comprising sending a warning signal to confirm identity of the speaker to add related information when the face images are inconsistent with the prestored face images.

* * * * *